United States Patent
Jung et al.

(10) Patent No.: US 8,798,004 B2
(45) Date of Patent: Aug. 5, 2014

(54) METHOD OF PERFORMING HANDOVER IN A BROADBAND WIRELESS ACCESS SYSTEM

(75) Inventors: In Uk Jung, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 13/502,101

(22) PCT Filed: Oct. 14, 2010

(86) PCT No.: PCT/KR2010/007025
§ 371 (c)(1),
(2), (4) Date: Apr. 13, 2012

(87) PCT Pub. No.: WO2011/046371
PCT Pub. Date: Apr. 21, 2011

(65) Prior Publication Data
US 2012/0201225 A1 Aug. 9, 2012

Related U.S. Application Data

(60) Provisional application No. 61/251,722, filed on Oct. 14, 2009.

(30) Foreign Application Priority Data
Apr. 9, 2010 (KR) .......................... 10-2010-0032551

(51) Int. Cl.
*H04W 4/00* (2009.01)
(52) U.S. Cl.
USPC .......................................... 370/331
(58) Field of Classification Search
CPC ............ H04W 36/0077; H04W 36/00; H04W 36/0055; H04W 36/08; H04W 36/36; H04W 36/0083; H04W 72/044; H04W 88/04; H04W 88/08; H04W 92/20
USPC ............... 370/328, 329, 331, 400, 401; 455/422.1, 436, 439, 450, 453, 456.1
See application file for complete search history.

(56) References Cited

U.S. PATENT DOCUMENTS

2006/0035639 A1* 2/2006 Etemad et al. ................. 455/436
2006/0079235 A1* 4/2006 Kim .............................. 455/439

(Continued)

FOREIGN PATENT DOCUMENTS

JP 2009-111493 5/2009

OTHER PUBLICATIONS

Chou, Kelvin, HO DG AWD Text Proposal on Intra-16m HO, IEEE 802.16 Broadband Wireless Access Working Group, IEEE C802.16m-09/0913r2, May 2009, 18 Pages.*

(Continued)

*Primary Examiner* — Edan Orgad
*Assistant Examiner* — Ivan O Latorre
(74) *Attorney, Agent, or Firm* — Lee, Hong, Degerman, Kang & Waimey

(57) ABSTRACT

A method for performing effective handover (HO) in a broadband wireless access system is disclosed. The method for controlling a mobile station (MS) to perform handover in a broadband wireless access system includes receiving a first message including at least one of first index information and second index information from a serving base station (SBS), wherein the first index information indicates a subframe to which an additional ranging opportunity for the mobile station (MS) is allocated from a target base station (TBS) and the second index information indicates a frame to which the additional ranging opportunity is allocated, and transmitting a ranging code to the target base station (TBS) through the additional ranging opportunity indicated by the first index information and the second index information.

7 Claims, 8 Drawing Sheets

(56) References Cited

U.S. PATENT DOCUMENTS

| | | |
|---|---|---|
| 2006/0203712 A1 | 9/2006 | Lim et al. |
| 2007/0191009 A1* | 8/2007 | Hong et al. ................... 455/436 |
| 2008/0125127 A1* | 5/2008 | Hwang ......................... 455/436 |
| 2008/0305798 A1 | 12/2008 | Son et al. |
| 2009/0011774 A1* | 1/2009 | Shan et al. ................. 455/456.1 |
| 2009/0109923 A1* | 4/2009 | Kojima ......................... 370/331 |
| 2009/0131056 A1* | 5/2009 | Bontu et al. .................. 455/436 |

OTHER PUBLICATIONS

Srinivasan, et al., "IEEE 802.16m System Description Document (SDD)," IEEE 802.16 Broadband Wireless Access Working Group, IEEE 802.16m-09/0034r2, Sep. 2009, pp. 1, 43-47, 112-114.

* cited by examiner

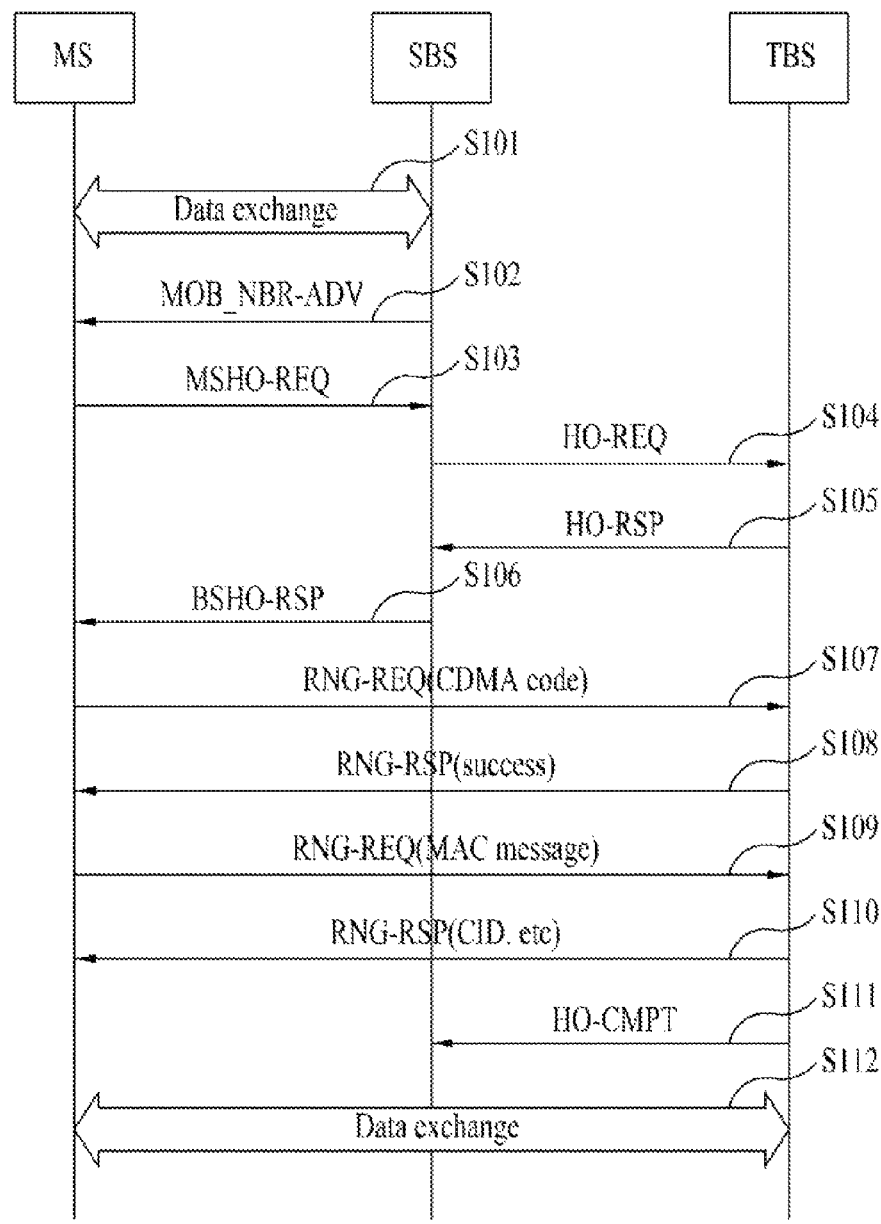
[Fig. 1]
RELATED ART

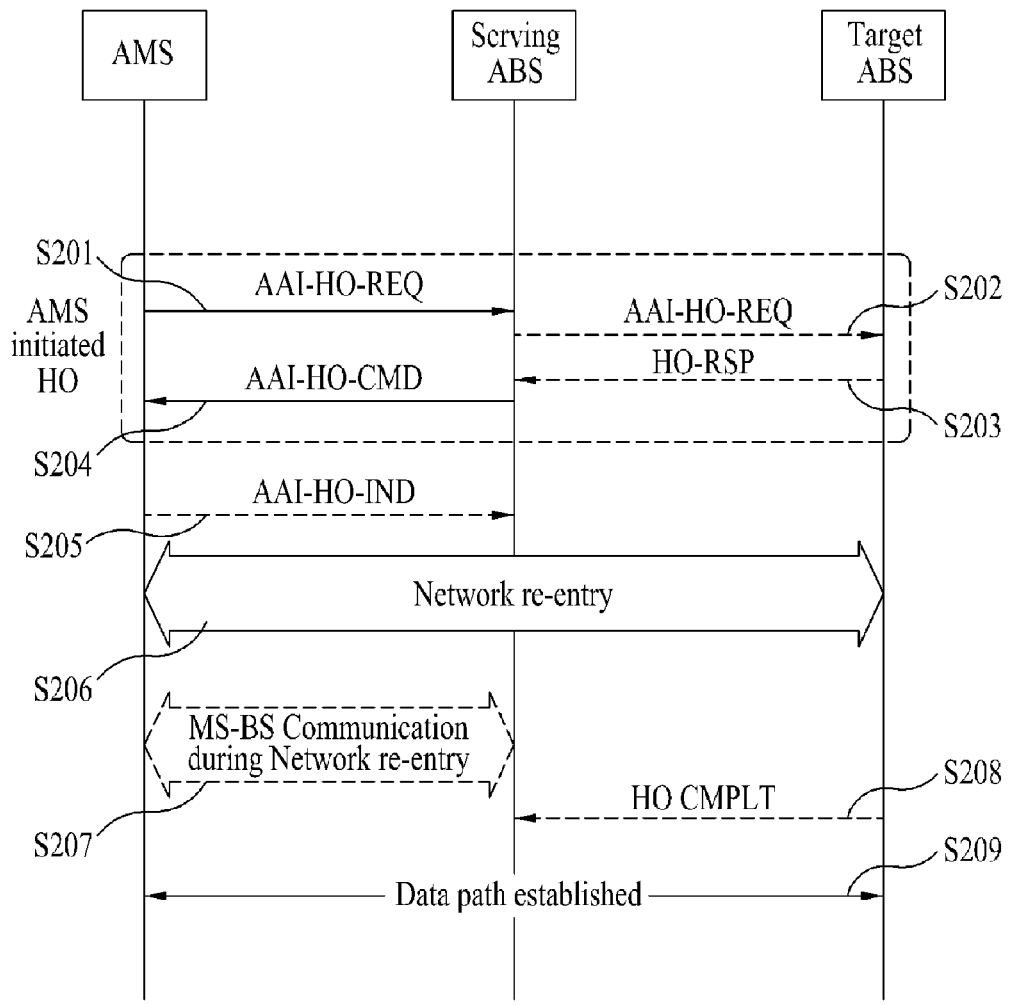
[Fig. 2]

[Fig. 3]
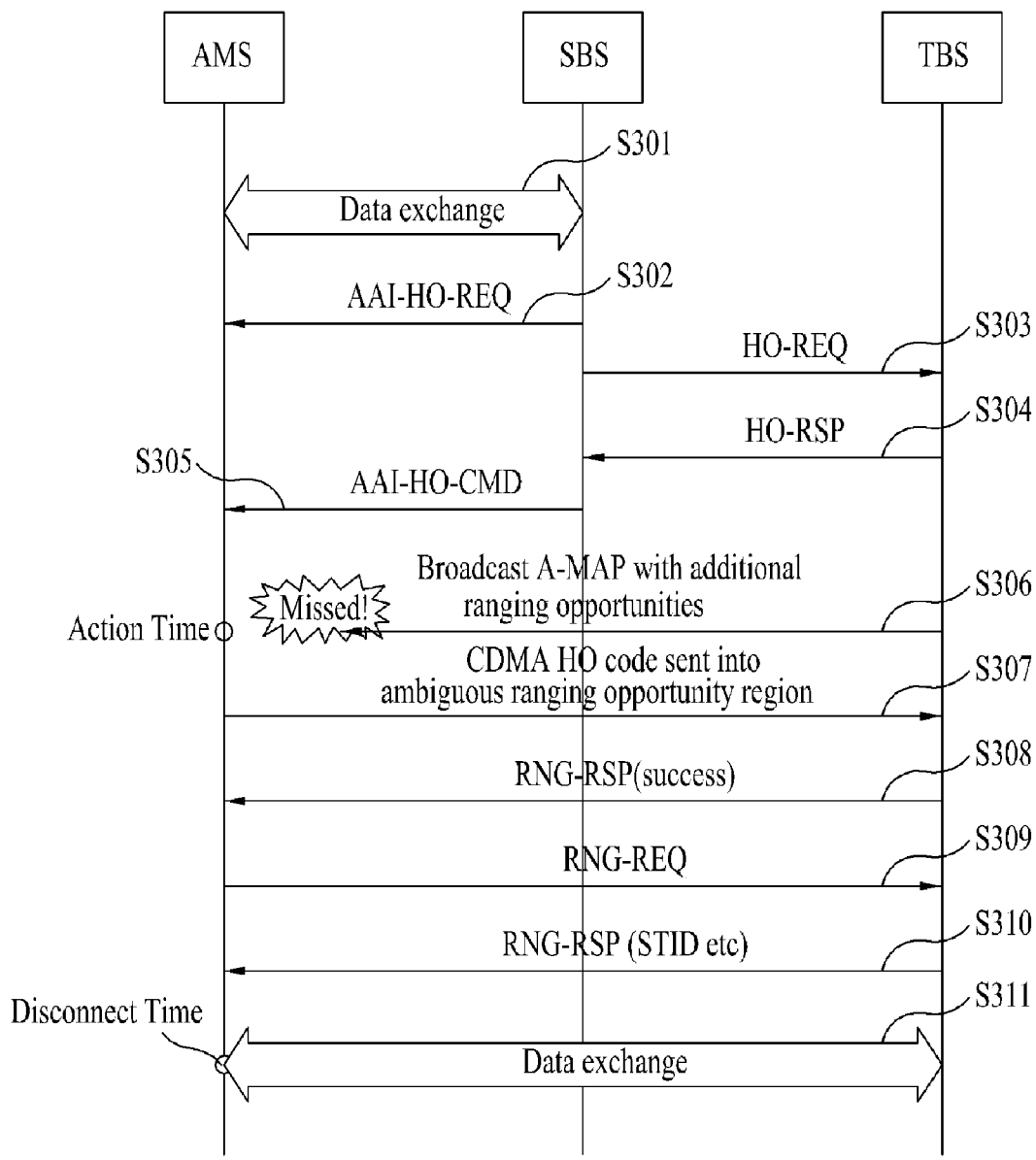

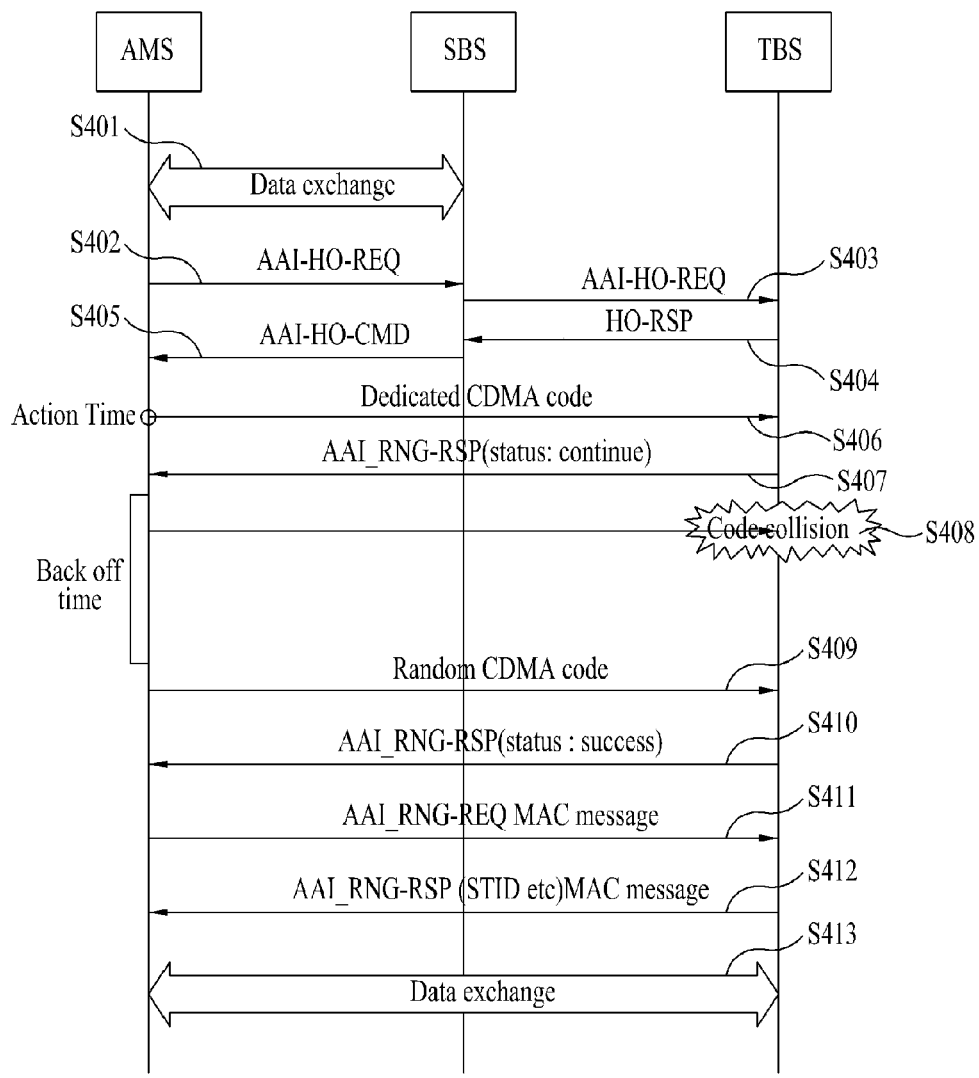
[Fig. 4]

[Fig. 5]
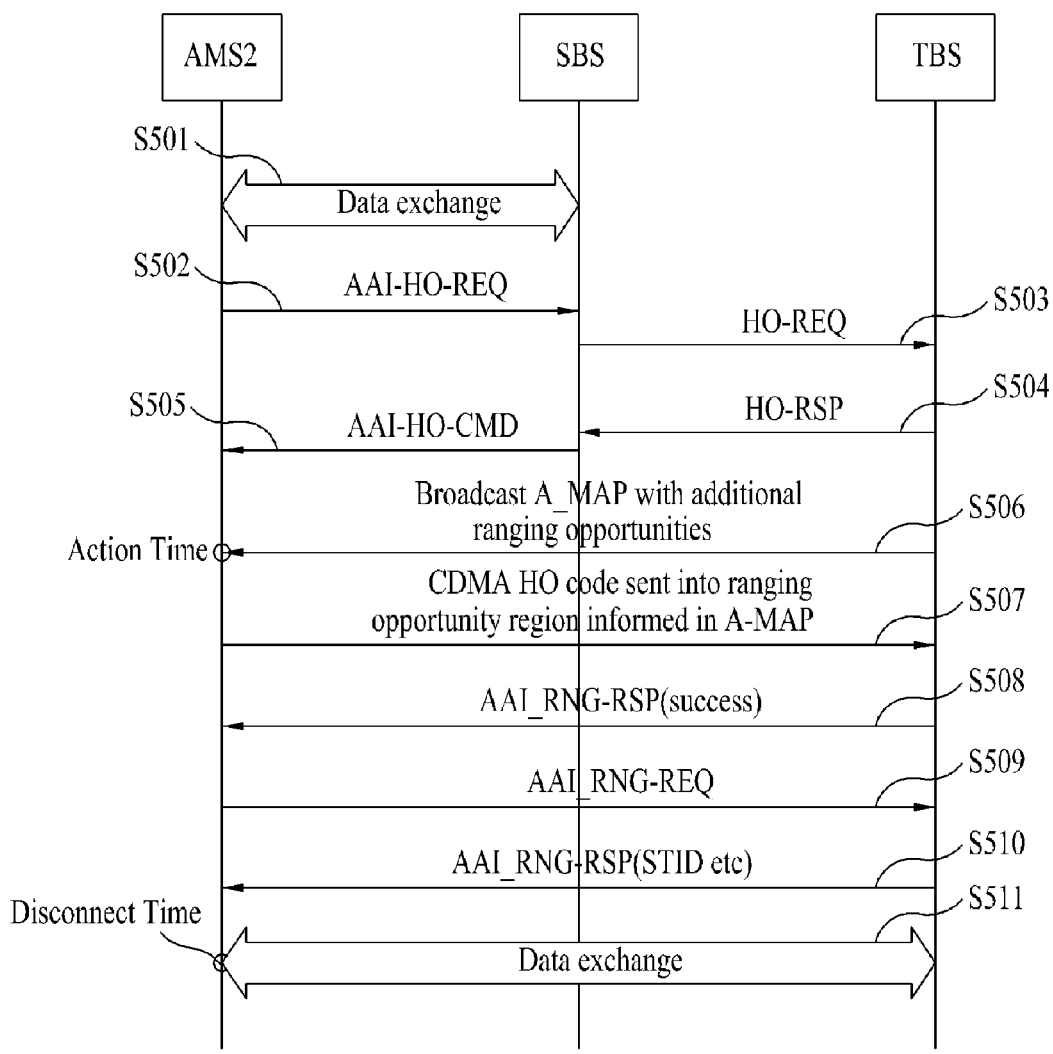

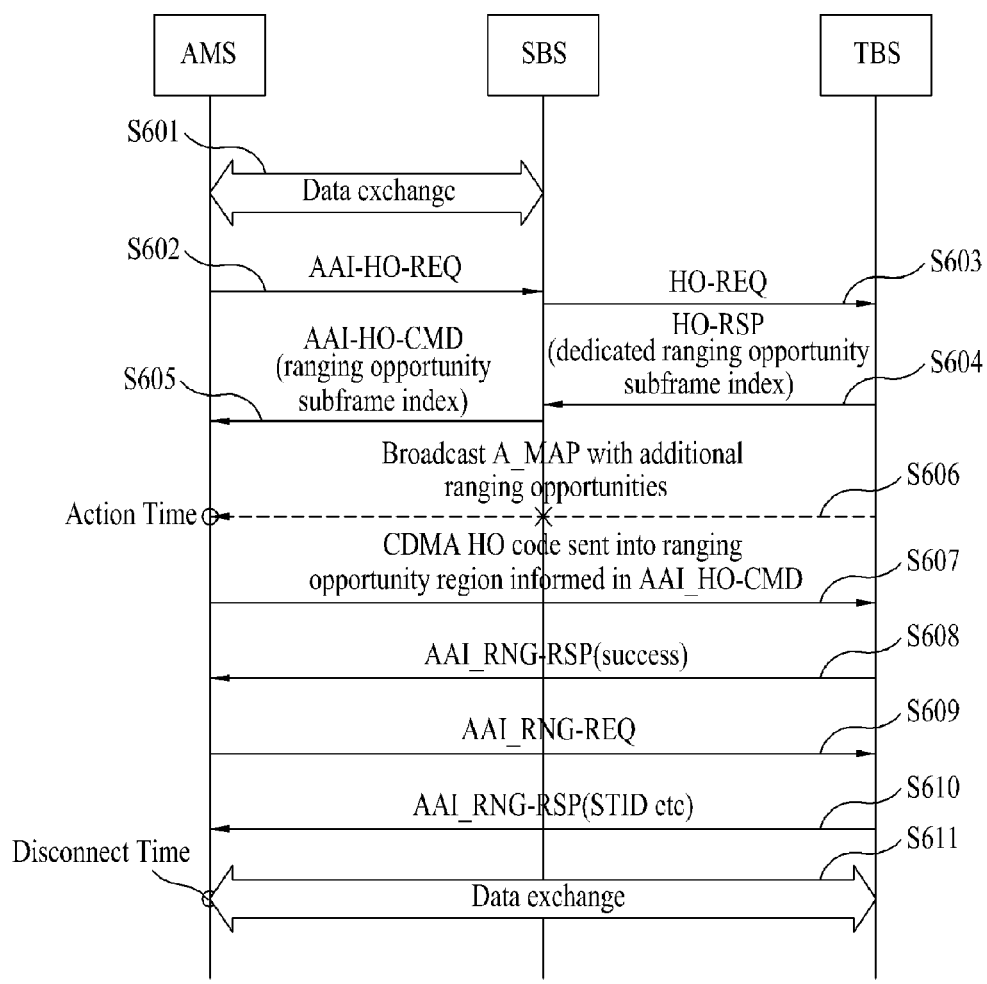
[Fig. 6]

[Fig. 7]
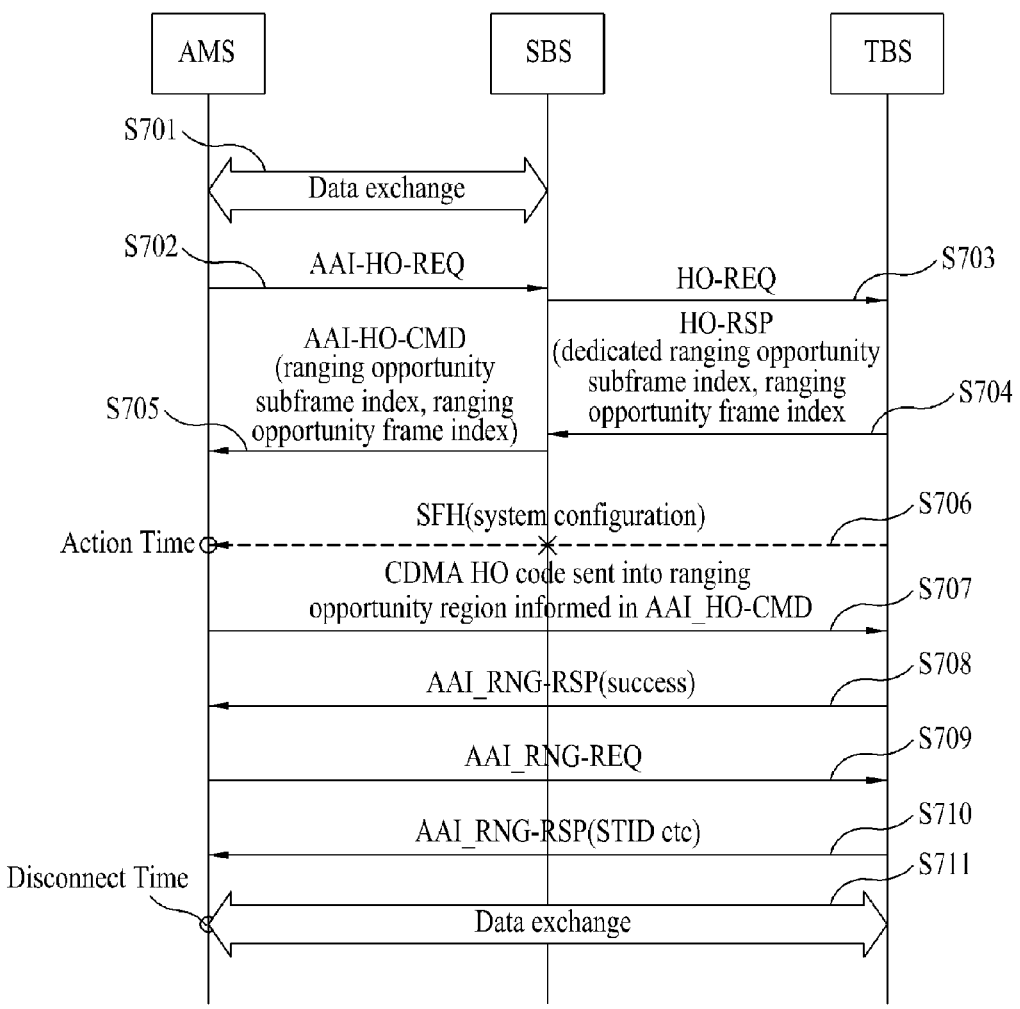

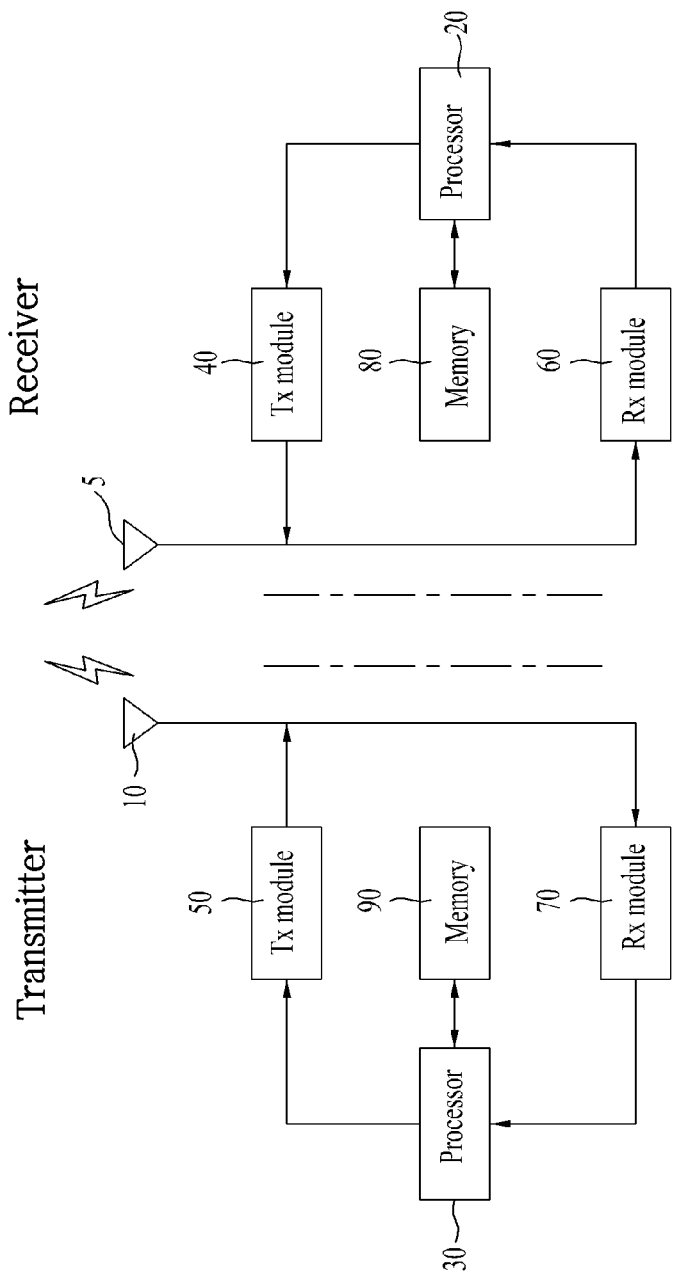
[Fig. 8]

METHOD OF PERFORMING HANDOVER IN A BROADBAND WIRELESS ACCESS SYSTEM

CROSS-REFERENCE TO RELATED APPLICATIONS

This application is the National Stage filing under 35 U.S.C. 371 of International Application No. PCT/KR2010/007025, filed on Oct. 14, 2010, which claims the benefit of earlier filing date and right of priority to Korean Application No. 10-2010-0032551, filed on Apr. 9, 2010, and also claims the benefit of U.S. Provisional Application Ser. No. 61/251, 722, filed on Oct. 14, 2009, the contents of which are all incorporated by reference herein in their entirety.

TECHNICAL FIELD

The present invention relates to a broadband wireless access system, and more particularly to a method for efficiently performing handover (HO).

BACKGROUND ART

Handover (HO) refers to movement of a mobile station (MS) from a wireless interface of one base station (BS) to a wireless interface of another BS. Hereinafter, a handover procedure in a general IEEE 802.16e system will be described.

A Serving Base Station (SBS) in an IEEE 802.16e network may broadcast information about neighbor BSs through a mobile neighbor advertisement (MOB_NBR-ADV) message in order to inform an MS of information (topology) about basic network configuration.

The MOB_NBR-ADV message includes system information about a serving BS and neighbor BSs, for example, a preamble index, a frequency, a handover optimization possibility, downlink channel descriptor (DCD)/uplink channel descriptor (UCD) information, etc.

The DCD/UCD information includes information of which an MS should be aware in order to exchange information through downlink and uplink. For example, the DCD/UCD information includes handover (HO) trigger information, and medium access control (MAC) version and media independent handover (MIH) capability information of a BS.

A general MOB_NBR-ADV message includes information about neighbor BSs of an IEEE 802.16e type only. Accordingly, information about neighbor BSs of a type other than IEEE 802.16e may be broadcast to MSs through a service identity information advertisement (SII-ADV) message. As a result, an MS may acquire information about BSs of a heterogeneous network by requesting a serving BS to transmit the SII-ADV message.

A procedure for an MS having information about neighbor BSs obtained through the above-described method to perform handover in an IEEE 802.16e network will be described in more detail with reference to FIG. 1.

FIG. 1 illustrates an example of a handover (HO) procedure which can be performed in an IEEE 802.16e system.

Referring to FIG. 1, an MS exchanges data with a serving BS (SBS) at step S101.

The SBS periodically broadcasts information about neighbor BSs to the MS through a MOB_NBR-ADV message at step S102.

The MS may start scanning for candidate handover (HO) BSs using a handover (HO) trigger condition while communicating with the SBS. The MS requests the SBS to perform a handover procedure by transmitting a handover request (MOB_MSHO-REQ) message when a handover condition is satisfied, for example, when a predetermined hysteresis margin value is exceeded at step S103.

The SBS informs candidate handover (HO) BSs included in the MOB_MSHO-REQ message that the MS has requested handover through a handover request (HO-REQ) message at step S104.

The candidate handover BSs take action for the MS having requested handover to transmit information about handover to the SBS through a handover response (HO-RSP) message at step S105.

The SBS transmits the information about handover, obtained through the HO-RSP message from the candidate handover (HO) BSs, to the MS through a handover response (MOB_BSHO-RSP) message. The MOB_BSHO-RSP message may include information necessary to perform handover, that is, a handover action time, a handover identifier (HO-ID), and a dedicated handover (HO) code division multiple access (CDMA) ranging code at step S106.

The MS determines one target BS (TBS) among the candidate BSs based on the information included in the MOB-BSHO-RSP message received from the SBS. The MS then transmits a CDMA code to the determined TBS to attempt ranging at step S107.

The TBS receiving the CDMA code may inform the MS of success or failure of ranging and physical correction values through a ranging response (RNG-RSP) message at step S108.

The MS transmits a ranging request (RNG-REQ) message for authentication to the TBS at step S109.

The TBS receiving the RNG-REQ message from the MS transmits system information, which can be used in a corresponding BS, such as a connection identifier (CID) to the MS through a ranging response (RNG-RSP) message at step S110.

If the TBS successfully completes authentication of the MS and transmits all update information, the TBS informs the SBS of success or failure of handover through a handover completion (HO-CMPT) message at step S111.

Next, the MS exchanges data with the TBS which has performed handover at step S112.

If a dedicated ranging code is used, there is no possibility of causing a collision between codes in a different way from the contention based ranging. However, if the ranging is failed, the contention based ranging should be performed, such that an unnecessary delay time may occur. In addition, if the dedicated ranging opportunity is additionally allocated to the MS, there is needed a method for effectively transmitting the dedicated ranging opportunity.

DISCLOSURE OF INVENTION

Technical Problem

Accordingly, the present invention is directed to a method for performing handover in a broadband wireless access system that substantially obviates one or more problems due to limitations and disadvantages of the related art.

An object of the present invention devised to solve the problem lies on a method for allowing a mobile station (MS) to be effectively handed over to a target base station (TBS) and an apparatus for performing the same.

Another object of the present invention devised to solve the problem lies on a method for efficiently allocating the additional ranging opportunity and an apparatus for performing handover (HO) using the same.

Another object of the present invention devised to solve the problem lies on a handover method for more efficiently using a dedicated ranging code, and an apparatus for performing the same.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

Solution to Problem

The object of the present invention can be achieved by providing a method for controlling a mobile station (MS) to perform handover in a broadband wireless access system, the method includes receiving a first message including at least one of first index information and second index information from a serving base station (SBS), wherein the first index information indicates a subframe to which an additional ranging opportunity for the mobile station (MS) is allocated from a target base station (TBS) and the second index information indicates a frame to which the additional ranging opportunity is allocated, and transmitting a ranging code to the target base station (TBS) through the additional ranging opportunity indicated by the first index information and the second index information.

The first message may further include an action time field. The method may further comprises receiving a superframe header (SFH) including system configuration information or an A-MAP from the target base station (TBS) at a specific time indicated by the action time field.

The A-MAP may include information about an allocation time point of the additional ranging opportunity.

The second index information may be an index for indicating a frame to which the additional ranging opportunity is allocated in a superframe in which the superframe header (SFH) is transmitted.

The first message may be an advanced air interface handover command (AAI_HO-CMD) message.

In another aspect of the present invention, provided herein is a method for controlling a target base station (TBS) to support handover of a mobile station (MS) in a broadband wireless access system, the method including transmitting a handover response message including at least one of first index information and second index information to a serving base station (SBS), wherein the first index information indicates a subframe to which an additional ranging opportunity for the mobile station (MS) is allocated and the second index information indicates a frame to which the additional ranging opportunity is allocated, and receiving a ranging code from the mobile station (MS) through the additional ranging opportunity indicated by the first index information and the second index information.

The handover response message may further include action time information. The method may further comprise broadcasting a superframe header (SFH) including system configuration information or an A-MAP at a specific time indicated by the action time information.

The A-MAP may include information about an allocation time point of the additional ranging opportunity.

The second index information may be an index for indicating a frame to which the additional ranging opportunity is allocated in a superframe in which the superframe header (SFH) is transmitted.

In another aspect of the present invention, provided herein is a mobile station (MS) operated in a broadband wireless access system, the mobile station (MS) including a processor, and a radio frequency (RF) module for transmitting and receiving an RF signal to and from an external part upon receiving a control signal from the processor. The processor controls the RF module to receive a first message including at least one of first index information and second index information from a serving base station (SBS), wherein the first index information indicates a subframe to which an additional ranging opportunity for the mobile station (MS) is allocated from a target base station (TBS) and the second index information indicates a frame to which the additional ranging opportunity is allocated; and transmits a ranging code to the target base station (TBS) through the additional ranging opportunity indicated by the first index information and the second index information.

The first message may further include an action time field, and the processor receives a superframe header (SFH) including system configuration information or an A-MAP from the target base station (TBS) at a specific time indicated by the action time field.

The A-MAP may include information about an allocation time point of the additional ranging opportunity.

The second index information may be an index for indicating a frame to which the additional ranging opportunity is allocated in a superframe in which the superframe header (SFH) is transmitted.

The first message may be an advanced air interface handover command (AAI_HO-CMD) message.

In another aspect of the present invention, provided herein is a mobile station (MS) operated in a broadband wireless access system, the mobile station (MS) including a processor, and a radio frequency (RF) module for transmitting and receiving an RF signal to and from an external part upon receiving a control signal from the processor. The processor controls the RF module to receive a dedicated CDMA ranging code and action time information from a serving base station (SBS) through an advanced air interface handover command (AAI_HO-CMD) message, transmits the dedicated CDMA ranging code to a target base station (TBS) at a specific time indicated by the action time information, and determines whether ranging based on the dedicated ranging code is re-performed according to a value of a reuse indicator that indicates a status of a response message for the code while simultaneously indicating whether the dedicated CDMA ranging code is reused.

If the response message indicates a continue status, the processor may re-perform the dedicated CDMA ranging code-based ranging if the reuse indicator is set to '1', and perform ranging using a randomly selected ranging code if the reuse indicator is set to '0'.

Advantageous Effects of Invention

The exemplary embodiments of the present invention have the following effects.

First, according to the embodiments of the present invention, a mobile station (MS) can more effectively perform handover (HO).

Second, through the additional ranging opportunity allocation method described in the embodiments of the present invention, the MS first acquires information of the TBS and attempts to perform ranging, or may perform ranging using information about the allocated additional ranging opportunity irrespective of additional information received from the TBS.

Third, through the method for reusing the dedicated ranging code according to the embodiments of the present invention, although the MS fails to operate initial ranging using the dedicated ranging code, the ranging can be re-executed through a legacy or conventional dedicated ranging code according to a dedicated code reuse indicator.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a flowchart illustrating a handover (HO) procedure for use in a general Institute of Electrical and Electronics Engineers (IEEE) 802.16e system.

FIG. 2 is a flowchart illustrating an HO procedure for use in a general IEEE 802.16m system.

FIG. 3 is a flowchart illustrating exemplary problems encountered in a general additional ranging opportunity allocation method.

FIG. 4 is a flowchart illustrating exemplary problems encountered in an HO procedure based on a general dedicated ranging code.

FIG. 5 is a flowchart illustrating one example of an additional ranging opportunity allocation method according to one embodiment of the present invention.

FIG. 6 is a flowchart illustrating another example of an additional ranging opportunity allocation method according to one embodiment of the present invention.

FIG. 7 is a flowchart illustrating another example of an additional ranging opportunity allocation method according to one embodiment of the present invention.

FIG. 8 is a block diagram illustrating a transmitter and a receiver according to another embodiment of the present invention.

BEST MODE FOR CARRYING OUT THE INVENTION

Exemplary embodiments of the present invention provide a variety of methods and apparatuses for performing an efficient and reliable handover.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be re-arranged. Some constructions or features of any one embodiment may be included in another embodiment and may be replaced with corresponding constructions or features of another embodiment.

In the description of drawings, procedures or steps, which may confuse the substance of the present invention, are not explained. Additionally, procedures or steps, which can be understood by those skilled in the art, are not explained as well.

In the exemplary embodiments of the present invention, a description is made of a data transmission and reception relationship between a base station (BS) and a mobile station (MS). Here, the BS refers to a terminal node of a network communicating directly with the MS. In some cases, a specific operation described as performed by the BS may be performed by an upper node of the BS.

Namely, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point (AP)', 'Advanced Base Station (ABS)', etc. The term 'MS' may be replaced with the term 'User Equipment (UE)', 'Subscriber Station (SS)', 'Mobile Subscriber Station (MSS)', 'mobile terminal', 'Advanced Mobile Station (AMS)', etc.

A transmitter means a node that transmits voice or data service and a receiver means a node that receives voice or data service. Hence, an MS may be a transmitter and a BS may be a receiver, on an uplink. Likewise, the MS may be a receiver and the BS may be a transmitter, on a downlink.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

The embodiments of the present invention can be supported by standard documents disclosed in at least one of the IEEE 802 system, 3GPP system, 3GPP LTE system, and 3GPP2 system which are radio access systems. That is, steps or portions that are not described in the embodiments of the present invention for the sake of clearly describing the spirit of the present invention may be supported by the above documents. For all terms used in this disclosure, reference can be made to the above standard documents. Especially, the embodiments of the present invention may be supported by at least one of P802.16-2004, P802.16e-2005, and P802.16Rev2 which are standard documents of the IEEE 802.16 system.

The specific terms described in the following description are provided to aid the understanding of the present invention and these terms may be changed without departing from the spirit of the present invention.

The following description of the present invention assumes that the IEEE 802.16 system is used as an example. Specifically, in the following description, the MS refers to an advanced mobile station (AMS) that satisfies the IEEE 802.16m standard, and the BS refers to an advanced base station (ABS) that also satisfies the IEEE 802.16m standard.

A handover (HO) procedure for use in an AMS and an ABS that follow the IEEE 802.16m system (i.e., WirelessMAN-OFDMA Advanced system) will hereinafter be described in detail.

In the IEEE 802.16m system, an HO procedure may largely involve (1) HO decision and initiation, (2) HO preparation, and (3) HO execution. Before performing these three procedures, an AMS needs to perform a scanning procedure in which it obtains (or scans) information about neighbor Advanced Base Stations (ABSs). The scanning procedure is similar to the scanning procedure in the IEEE 802.16e network. For example, when there is a non-communication period in which the AMS does not communicate with a Serving ABS (S-ABS), the AMS may scan neighbor ABSs during the non-communication period.

The handover (HO) for use in the HO decision and initiation procedure may be classified into an AMS initiated HO and an ABS initiated HO according to an HO initiation entity. In addition, the HO execution procedure is adapted to perform network re-entry to the target ABS at an action time.

The aforementioned HO procedure will hereinafter be described with reference to FIG. 2.

FIG. 2 is a flowchart illustrating an HO procedure for use in a general IEEE 802.16m system.

Referring to FIG. 2, the AMS may transmit an Advanced Air Interface HO REQuest (AAI_HO-REQ) message to a service ABS to perform HO initiation at step S201.

The serving ABS exchanges information with target ABS(s), and negotiates not only conditions for the HO execution procedure but also resources (dedicated ranging code, STID, security parameters, etc) with the Target ABS at steps S202 and S203.

The serving ABS may transmit an AAI_HO-CMD message to the AMS at step S204 such that it can transmit target-ABS information obtained through the negotiation process to the AMS.

In this case, the AAI_HO-CMD message transmitted to the AMS includes an action time and a disconnect time. The action time may indicate a time at which the AMS performs network re-entry and the disconnect time may indicate a time at which the serving ABS stops UL/DL resource allocation.

After performing the HO preparation procedure, the AMS may conditionally transmit an AAI_HO-IND message to the serving ABS at step S205.

There are various conditions for transmitting the AAI_HO-IND message, and the following representative conditions 1) and 2) are shown for better understanding of the present invention.

1) One case in which he AMS desires to perform HO cancellation on the basis of conditions predetermined by the serving ABS.

2) The other case in which AAI_HO-CMD message includes information about several target ABSs.

As described above, in the HO execution procedure, the AMS performs network re-entry to the target ABS in response to an action time at step S206.

In this case, the AMS may perform network re-entry through either CDMA ranging or an AAI ranging request (AAI_RNG-REQ) message. If the AMS performs Entry Before Brake (EBB), it may continuously exchange data with the serving ABS during an available interval (AI), and may perform network re-entry to the target ABS during an unavailable interval (UAI) at step S207. If the AMS performs Break Before Entry (BBE), the AI or the UAI may not be determined in the same manner as in a hard HO procedure of a general IEEE 802.16e network.

Upon completion of the network re-entry of the AMS, the target ABS may inform the serving ABS of HO completion (HO COMPLT) at step S208, and the AMS may normally exchange data with the ABS at step S209.

The aforementioned HO procedure may indicate the AMS initiated HO procedure. The ABS initiated HO may be identical to FIG. 2 to the exclusion of S201.

Meanwhile, when the AMS is handed over to the target ABS, the HO execution may be performed through any one of the following three methods 1, 2, and 3.

1. Fast Ranging:

In the fast ranging method, MAC ranging (i.e., the exchanging of AAI_RNG-REQ/RSP message) is immediately performed without performing the HO CDMA code ranging.

2. Contention Based CDMA Code Ranging:

In the Contention based CDMA code ranging method, network re-entry is performed by the ranging method for transmitting a randomly-selected CDMA code to a ranging region of the ABS.

3. Dedicated CDMA Code Ranging:

In the dedicated CDMA code ranging method, network re-entry is performed by the ranging based on the dedicated CDMA code allocated to the corresponding AMS through the AAI_HO-CMD message.

In the aforementioned fast ranging method 1, on the assumption that the CDMA ranging procedure is omitted and uplink synchronization is established with the target ABS, the AMS performs network re-entry to the target ABS.

In the Contention based CDMA code ranging method 2 and the Dedicated CDMA code ranging method 3, the AMS performs CDMA ranging to establish UL synchronization with the target ABS. The Contention based CDMA code ranging method 2 and the Dedicated CDMA code ranging method 3 can be distinguished from each other according to whether the code or ranging opportunity is dedicatedly assigned to the AMS or is performed based on contention.

In the following description, various problems encountered in the aforementioned HO procedure are given below.

Additional Ranging Opportunity

If many more AMSs are congested at a specific ABS, code collision may frequently occur during the CDMA code ranging for HO. In order to solve such frequent code collision, the target ABS may allocate an additional CDMA ranging opportunity to the AMS.

That is, the target ABS may inform the AMS of the additional ranging opportunity to the exclusion of the conventional CDMA code ranging. The additional ranging opportunity may be broadcast to the AMS through an A-MAP (Broadcast Assignment A-MAP IE) or a super frame header (SFH).

In more detail, opportunity index information in which the additional ranging opportunity is configured in the form of an index is transmitted to the AMS through the AAI_HO-CMD message, and the AMS may determine the presence or absence of the additional ranging opportunity by referring to index information received in the SFH or A-MAP of the target ABS. However, according to the aforementioned method, if the AMS fails to receive the SFH or A-MAP from the target ABS, it is impossible for the AMS to use the aforementioned method. A detailed description thereof will hereinafter be described with reference to FIG. 3.

FIG. 3 is a flowchart illustrating problems encountered in a general additional ranging opportunity allocation method.

In FIG. 3, steps S301 to S305 are similar to steps S201 to S204 of FIG. 2, and as such detailed description thereof will herein be omitted for convenience of description. However, the AAI_HO-CMD message may further include an opportunity index indicating the position of additional ranging opportunity at step S305.

Thereafter, although the AMS attempts to receive the A-MAP including the additional ranging opportunity information from the target ABS at a specific time point indicated by action time information, the AMS may fail to receive the A-MAP due to a poor channel condition, etc. at step S306.

If the AMS fails to receive the A-MAP, it is impossible for the AMS to recognize the additional ranging opportunity using only the index, such that information about which one of ranging regions may receive the CDMA ranging code becomes ambiguous at step S307.

The subsequent steps from step S307 are similar to those of the HO procedure based on a general CDMA code, and as such detailed description thereof will herein be omitted for convenience of description.

As can be seen from FIG. 3, although the AMS obtains the index about the additional ranging opportunity through the AAI_HO-CMD message, it is impossible to recognize the additional ranging opportunity allocated to the AMS on the assumption that the AMS fails to receive the SFH or A-MAP of the target ABS.

Problems of Dedicated Ranging Code

In the case of using the HO procedure through the dedicated ranging code, the following problems may be encountered and detailed description thereof will be given below.

First, due to a deficiency of CDMA codes, the target ABS may not allocate the dedicated code to the AMS that has requested the HO.

Next, when the AMS transmits the dedicated ranging code to a target ABS (TBS) and receives a ranging response (RNG-RSP) message indicating a failure status (not a success status) from the target ABS (TBS), the AMS must retransmit a general ranging code, such that a time delay caused by code collision may occur. A detailed description thereof will hereinafter be described with reference to FIG. 4.

FIG. 4 is a flowchart illustrating exemplary problems encountered in an HO procedure based on a general dedicated ranging code.

Steps S401 to S405 of FIG. 4 are similar to steps S201 to S204 of FIG. 2, and as such detailed description will herein be omitted for convenience of description. However, it should be noted that the AAI_HO-CMD message at step S405 may further include the dedicated ranging code.

Thereafter, the AMS may transmit the dedicated ranging code (i.e., dedicated CDMA code) to the target ABS (TBS) at a specific time indicated by action time information at step S406.

If the AMS receives an AAI ranging response (AAI_RNG-RSP) message as a response to the dedicated ranging code (i.e., dedicated CDMA code) and the received AAI_RNG-RSP message indicates a continue status, namely, if the additional ranging is needed, the CDMA code ranging needs to be re-performed at step S407.

In this case, it is impossible to use the previous dedicated code any longer, and the contention-based ranging must be performed through the randomly selected code as in the general CDMA code ranging. In this case, it is impossible to effectively use non-contention (i.e., collision free) characteristics indicating advantages of the dedicated code. If there is a collision between codes that have been transmitted at random from the target ABS at step S408, the AMS needs to re-perform the ranging after the lapse of a predetermined backoff time at step S409.

The subsequent procedures are similar to those of a general HO procedure, and as such detailed description thereof will herein be omitted for convenience of description. Not only in the aforementioned case in which the AMS receives the AAI_RNG-RSP message indicating the continue status, but also in a case in which the AMS does not receive the AAI ranging acknowledgement (AAI_RNG-ACK) message or the AAI-RNG-RSP message within a specific time, the AMS is unable to use the dedicated ranging code and needs to perform a general contention-based ranging procedure.

First Embodiment

A method for providing information about the ranging opportunity through the SFH or A-MAP of the target ABS according to one embodiment of the present invention will hereinafter be described in detail.

The aforementioned method is one of broadcast methods, and may be applied to all AMSs that perform ranging based on dedicated ranging code or contention-based ranging. A detailed description thereof will hereinafter be described with reference to FIG. 5.

FIG. 5 is a flowchart illustrating one example of an additional ranging opportunity allocation method according to one embodiment of the present invention.

Steps S501 to S505 of FIG. 5 are similar to steps S201 to S204 of FIG. 2, and as such detailed description thereof will herein be omitted for convenience of description.

The AMS (AMS2) may receive information about the additional ranging region from the target ABS (TBS) through the A-MAP at a specific time indicated by action time information at step S506.

Therefore, the AMS may transmit the CDMA ranging code to the target ABS (TBS) using the ranging opportunity obtained through the A-MAP at step S507.

Subsequent steps from step S507 are similar to those of a general HO procedure, and as such detailed description thereof will herein be omitted for convenience of description. However, the aforementioned method may have difficulty in solving the problems of FIG. 3.

Therefore, according to another aspect of the present invention, the present invention provides a method for allocating the additional ranging opportunity to the AMS in units of a frame or subframe through the handover command (AAI_HO-CMD) message.

That is, in order to solve the aforementioned problems of FIG. 3, the serving ABS does not allocate an index of information about the additional ranging opportunity to the AMS performing coordinated HO, and allocates an index of a subframe generating the ranging opportunity to the coordinated HO AMS through the AAI_HO-CMD message. For this purpose, it is assumed that one ranging opportunity is allocated to one subframe, and the allocation position is always fixed within a subframe. In this case, the SFH or A-MAP of the target ABS may directly include information about the additional ranging opportunity as shown in FIG. 5, or another method for informing the AMS of the additional ranging opportunity using opportunity index information contained in the AAI_HO-CMD message may be used as shown in FIG. 3.

FIG. 6 is a flowchart illustrating another example of an additional ranging opportunity allocation method according to one embodiment of the present invention.

Referring to FIG. 6, when the AMS connected to the serving ABS can normally exchange data with the serving ABS (SBS) at step S601, the AMS transmits the AAI_HO-REQ message to the serving ABS (SBS) to perform HO at step S602.

The serving ABS (SBS) exchanges information or data with target ABS(s), and negotiates not only conditions for the HO execution procedure but also resources (dedicated ranging code, STID, security parameters, etc) with the target ABS at steps S603 and S604.

In this case, the additional ranging opportunity to be allocated to the AMS may also be negotiated, such that index information of a subframe to which the additional ranging opportunity for the corresponding AMS is allocated by the target ABS can be obtained by the serving ABS.

The index of the subframe to which the additional ranging opportunity is allocated may be transmitted from the serving ABS to the AMS through the AAI_HO-CMD message at step S605.

Therefore, although the AMS does not receive the A_MAP from the target ABS at a specific time indicated by action time information at step S606, the AMS may transmit the CDMA ranging code to the target ABS (TBS) using the additional ranging opportunity indicated by the subframe index information received through the AAI_HO-CMD message at step S607.

Subsequent steps from step S607 are similar to those of a general HO procedure, and as such detailed description thereof will herein be omitted for convenience of description.

In accordance with another aspect of the present invention, the action time information may be established to be a specific time at which the SFH of the target ABS is transmitted.

In other words, after the AMS first receives the SFH of the target ABS and confirms a system configuration status, the ranging can be normally performed. In this case, if the additional ranging opportunity is present in a frame different from that of the SFH that has been transmitted at an action time, information indicating which frame receives the corresponding ranging opportunity is needed. For this purpose, a total of four frames are present in one superframe, such that a frame including the ranging opportunity may be indicated by 2 bits. In this way, the frame index indicating the position of a frame including the ranging opportunity may also be transmitted to the AMS through the AAI_HO-CMD message. If the frame for SFH reception is identical to the other frame including the ranging opportunity, the frame index may be omitted as necessary. A detailed description thereof will hereinafter be described with reference to FIG. 7.

FIG. 7 is a flowchart illustrating another example of an additional ranging opportunity allocation method according to one embodiment of the present invention.

Referring to FIG. 7, when the AMS connected to the serving ABS can normally exchange data with the serving ABS (SBS) at step S701, the AMS transmits the AAI_HO-REQ message to the serving ABS (SBS) to perform HO at step S702.

The serving ABS (SBS) exchanges information or data with target ABS(s), and negotiates not only conditions for the HO execution procedure but also resources (dedicated ranging code, STID, security parameters, etc) with the target ABS at steps S703 and S704.

In this case, the additional ranging opportunity to be allocated to the AMS may also be negotiated, such that the serving ABS (SBS) can obtain index information of a subframe to which the additional ranging opportunity for the corresponding AMS is allocated from the target ABS, and can also obtain the frame index information including the ranging opportunity from the serving ABS (SBS) at a superframe that includes the SFH transmitted at a time indicated by action time information.

The subframe index and the frame index for allocation of the additional ranging opportunity are transmitted from the serving ABS to the AMS through the AAI_HO-CMD message at step S705.

Thereafter, the AMS receives the SFH from the target ABS at a time indicated by action time information such that it can obtain system configuration information of the target ABS at step S706.

The AMS that has obtained the system configuration information of the target ABS may transmit the CDMA ranging code using the ranging opportunity indicated by the subframe/frame index information that has received the AAI_HO-CMD message.

Subsequent steps from step S706 are similar to those of a general HO procedure, and as such detailed description thereof will herein be omitted for convenience of description.

The serving ABS and the target ABS may support the CDMA ranging of the AMS using the aforementioned methods separately or in combination.

That is, although the HO coordination supported AMS that has received the dedicated code or the ranging opportunity through the AAI_HO-CMD message does not receive the A-MAP or the SFH when performing network re-entry to the target ABS, the AMS can succeed in HO CDMA ranging. In contrast, the uncoordinated HO AMS or the AMS having no dedicated code or no ranging opportunity receives the A-MAP or the SFH from the target ABS, such that it can perform contention-based HO CDMA code ranging in the additional ranging opportunity region.

Second Embodiment

When the AMS performs HO CDMA code ranging using the dedicated code during the HO procedure, it may need to re-execute the CDMA code ranging. In more detail, if the code is abnormally transmitted from the AMS to the target ABS, or if the AMS does not receive the AAI_RNG-RSP message from the target ABS after completion of normal code transmission, or if a status of the AAI_RNG-RSP message received from the target ABS is indicative of 'continue', the CDMA code ranging needs to be re-executed. Namely, if the additional ranging is required or if CDMA allocation information about the transmitted code or the RNG-ACK or RNG-RSP message is not received within a specific time, it is necessary to re-execute the CDMA code ranging. The CDMA code ranging re-execution means that coordination of physical parameters (such as an additional time or a frequency offset) is required for UL synchronization.

However, in general, the dedicated CDMA ranging code is effective only once. Thus, it is necessary to perform the contention-based CDMA code ranging when the AMS must perform UL synchronization through additional CDMA ranging. However, there is a probability of causing code collision, such that an HO interruption time may be increased.

Therefore, according to another embodiment of the present invention, the target ABS can establish the dedicated CDMA code transmitted from the AMS until the AMS completes UL synchronization or during a predetermined time corresponding to a specific number of times.

That is, in the case where the AMS fails to perform initial ranging and receives the AAI_RNG-RSP message indicating a continue status, or does not receive the AAI_RNG-RSP message as a response to the transmitted CDMA code, the target ABS may inform the AMS of the possibility of reusing the previous dedicated CDMA code using the following method.

In order to indicate the possibility of reusing the previous dedicated CDMA code, the embodiment of the present invention provides a method for defining an indicator indicating whether the previously-allocated dedicated CDMA ranging code is reused or not.

The dedicated ranging code reuse indicator proposed in the embodiment of the present invention will hereinafter be described in detail. The dedicated ranging code indicator according to the embodiment of the present invention has the size of 1 bit. If the dedicated ranging code indicator is set to '0', this means that it is impossible to reuse the corresponding code. In this case, the target ABS may allocate a new dedicated code and/or a dedicated ranging opportunity to the AMS. Otherwise, the AMS performs the contention-based ranging. If the dedicated ranging code indicator is set to '1', this means that the previously-allocated dedicated ranging code can be reused.

In addition, the effective time or the effective number of times may be assigned to the dedicated code. Information about the effective time or the effective number of times is configured in the form of one-bit indicator so as to indicate whether the code has expired or not. Or, a bit indicating either effective time information established in units of a frame or subframe or the information about the effective number of times is contained in the AAI_RNG-RSP message, such that the effective time information or the information about the effective number of times can be explicitly notified to the AMS. If the expiration of the effective time or the expiration of the effective number of times is implicitly notified to the AMS, information for commanding a new dedicated code or the contention-based ranging may be contained in the AAI_RNG-RSP message. In this case, the AAI_RNG-RSP message may be a response to the dedicated ranging code initially transmitted from the AMS to the target ABS. For example, the AAI_RNG-RSP message may indicate a continue status.

The aforementioned method for implicitly or explicitly informing the AMS of whether the dedicated code is valid may be used selectively or in combination.

In the meantime, the AAI_RNG-RSP message transmitted from the target ABS to the AMS as a response to the ranging code transmitted from the AMS may be replaced with the AAI_RNG-ACK message according to a system type. In addition, the term "additional ranging opportunity" may also be replaced with another term "dedicated ranging opportunity".

Advanced Mobile Station (AMS) and Advanced Base Station (ABS) Structure

Now a description will be given of an MS and a BS (femto BS (FBS) and macro BS (MBS)) for implementing the above-described exemplary embodiments of the present invention, according to another exemplary embodiment of the present invention.

The MS may operate as a transmitter on an uplink and as a receiver on a downlink, while the BS may operate as a receiver on the uplink and as a transmitter on the downlink. That is, each of the AMS and the ABS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 8.

FIG. 8 is a block diagram of a transmitter and a receiver according to another exemplary embodiment of the present invention.

Referring to FIG. 8, the left part corresponds to the transmitter and the right part corresponds to the receiver. Each of the transmitter and the receiver may include an antenna 5 or 10, a processor 20 or 30, a Transmission (Tx) module 40 or 50, a Reception (Rx) module 60 or 70, and a memory 80 or 90. The components of the transmitter are the counter parts of those of the receiver. The components of the transmitter and the receiver will be described below in more detail.

The antennas 5 and 10 include Tx antennas for transmitting signals generated from Tx modules 40 and 50 and Rx antennas for receiving radio frequency (RF) signals and providing the received RF signals to the Rx modules 60 and 70. If Multiple Input Multiple Output (MIMO) is supported, two or more antennas may be provided.

Each of the antenna, the Tx module, and the Rx module may include an RF module therein.

The processors 20 and 30 generally provide overall control to the AMS. Especially, the processors 20 and 30 may perform a controller function for implementing the above-described exemplary embodiments of the present invention, a variable MAC frame control function based on service characteristics and a propagation environment, a handover (HO) function, an authentication and encryption function, etc. In more detail, the processors 20 and 30 may provide overall control to the HO procedure shown in FIGS. 5 to 7.

Specifically, the processor of the AMS may obtain the index of the frame and/or subframe to which the additional ranging opportunity is allocated by the target ABS, through the AAI_HO-CMD message. Thus, although the AMS does not receive the A-MAP including information of the additional ranging opportunity form the target ABS during the action time, the processor may control the AMS to perform the CDMA ranging using the additional ranging opportunity indicated by information obtained through the AAI_HO-CMD message. If the action time information indicates an SFH transmission time of the target ABS, the AMS first receives the SFH, such that it can first obtain system configuration information of the target ABS.

In addition, according to another embodiment of the present invention, if the AMS receives the dedicated code through the handover command (AAI_HO-CMD) message as described above, the processor may receive the AAI_RNG-RSP message as a response to the dedicated ranging code initially transmitted to the target ABS. In this case, provide that the AAI_RNG-RSP message indicates a continue status and the dedicated code reuse indicator contained in the AAI_RNG-RSP message is set to '0', the AMS processor may control the contention-based ranging to be performed. Otherwise, if the dedicated code reuse indicator is set to '1', the AMS processor may attempt to re-perform the ranging using the previous dedicated ranging code.

Further, the AMS processor may provide overall control to the operations described in the above-mentioned embodiments.

The Tx modules 40 and 50 may encode and modulate transmission data scheduled by the processors 20 and 30 according to a predetermined coding and modulation scheme and provide the modulated data to the antenna 10.

The Rx modules 60 and 70 may recover original data by demodulating and decoding data received through the antennas 5 and 10 and provide the recovered data to the processors 20 and 30.

The memories 80 and 90 may store programs for processing and control of the processors 20 and 30 and temporarily store input/output (I/O) data. Each of the memories 80 and 90 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

In the meantime, the BS may perform a control function for implementing the above-described exemplary embodiments of the present invention, Orthogonal Frequency Division Multiple Access (OFDMA) packet scheduling, Time Division Duplex (TDD) packet scheduling and channelization, a variable MAC frame control function based on service characteristics and a propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

MODE FOR THE INVENTION

Various embodiments have been described in the best mode for carrying out the invention.

INDUSTRIAL APPLICABILITY

The embodiments of the present invention are applicable to various wireless access systems including a 3GPP system, a 3GPP2 system, and/or an IEEE 802.xx system. Besides these wireless access systems, the embodiments of the present invention are applicable to all technical fields in which the wireless access systems find their applications.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for performing a handover in a wireless access system, the method comprising:
   receiving, by a mobile station (MS) from a serving base station (SBS), a handover command message including an action time field indicating a number of a frame in which the MS starts to perform network reentry;
   receiving, by the MS from a target base station (TBS), a SFH (super frame header) including a ranging opportunity; and
   transmitting, by the MS to the TBS, a ranging code on or after the frame indicated by the action time field for the network reentry,
   wherein, when a dedicated ranging code and a dedicated ranging information are included in the handover command message, the dedicated ranging code is transmitted in a subframe indicated by the dedicated ranging information, the dedicated ranging code and the dedicated ranging information being a ranging code and a ranging opportunity dedicated to the MS, respectively,
   wherein the dedicated ranging information indicates a subframe index of a ranging opportunity allocated by the TBS, and
   wherein, when the dedicated ranging code and the dedicated ranging information are not included in the handover command message, a randomly selected ranging code is transmitted through the ranging opportunity indicated by the SFH.

2. The method of claim 1, wherein the transmitting the ranging code to the target base station (TBS) on or after the frame indicated by the action time field comprises:
   determining whether or not the dedicated ranging code and the dedicated ranging information are included in the handover command message.

3. The method of claim 1, further comprising:
   performing a handover from the SBS to the TBS based on the ranging code.

4. A method for performing a handover in a wireless access system, the method comprising:
   broadcasting, by a target base station (TBS), a SFH (super frame header) including a ranging opportunity;
   receiving, by the TBS from a mobile station (MS), a ranging code on or after the frame indicated by an action time field indicating a number of a frame in which the MS starts to perform network reentry, the action time field included in a handover command message received by the MS from a serving base station (SBS),
   wherein, when the handover command message includes a dedicated ranging code and a dedicated ranging information, the dedicated ranging code is received in a subframe indicated by the dedicated ranging information, the dedicated ranging code and the dedicated ranging information being a ranging code and a ranging opportunity dedicated to the MS, respectively,
   wherein the dedicated ranging information indicates a subframe index of a ranging opportunity allocated by the TBS, and
   wherein a randomly selected ranging code is transmitted through the ranging opportunity indicated by the SFH the dedicated ranging code and the dedicated ranging information are not included in the handover command message; and
   performing, by the TBS, a handover of the MS from the SBS to the TBS based on the ranging code.

5. A mobile station (MS) operated in a wireless access system, the MS comprising:
   a radio frequency (RF) module for transmitting and receiving an RF signal to and from an external part; and
   a processor operatively connected to the RF module and configured to
      receive, from a serving base station (SBS), a handover command message including an action time field indicating a number of a frame in which the MS starts to perform network reentry,
      receive, from a target base station (TBS), a SFH (super frame header) including a ranging opportunity, and
      transmit a ranging code to the TBS on or after the frame indicated by the action time field for the network reentry, wherein, when a dedicated ranging code and a dedicated ranging information are included in the handover command message, the dedicated ranging code is transmitted in a subframe indicated by the dedicated ranging information, the dedicated ranging code and the dedicated ranging information being a ranging code and a ranging opportunity dedicated to the MS, respectively, wherein the dedicated ranging information indicates a subframe index of a ranging opportunity allocated by the TBS, and wherein, when the dedicated ranging code and the dedicated ranging information are not included in the handover command message, a randomly selected ranging code is transmitted through the ranging opportunity indicated by the SFH.

6. The mobile station (MS) according to claim 5, wherein the processor is further configured to determine whether or not the dedicated ranging code and the dedicated ranging information are included in the handover command message.

7. The mobile station (MS) according to claim 5, wherein the processor is further configured to perform a handover from the SBS to the TBS based on the ranging code.

* * * * *